United States Patent Office
3,625,049
Patented Dec. 7, 1971

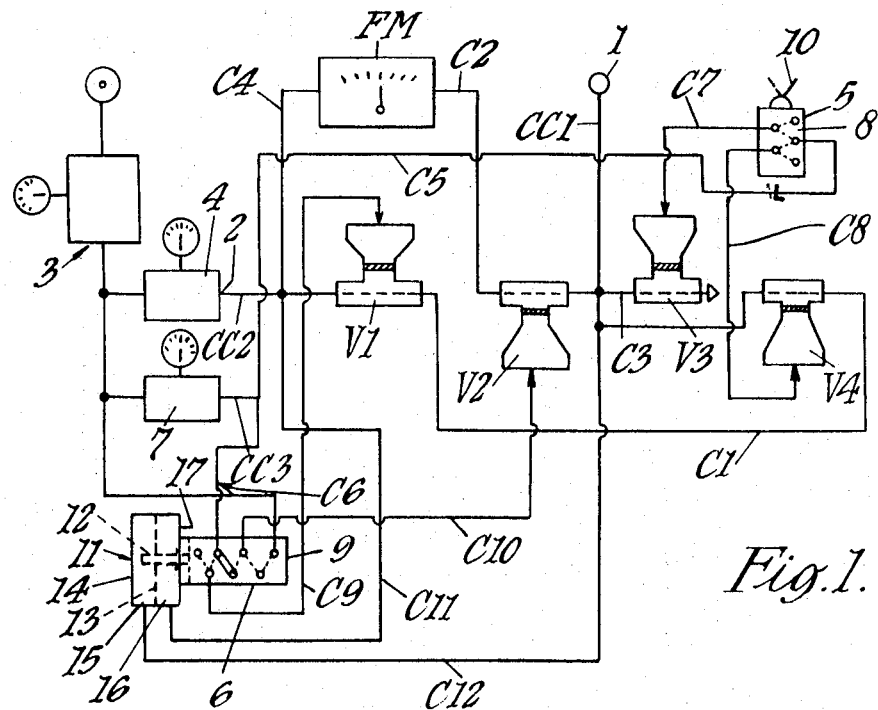
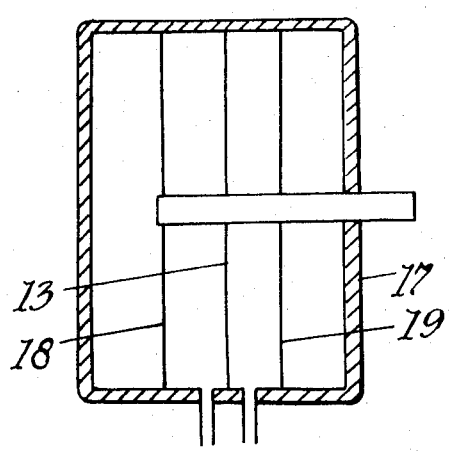
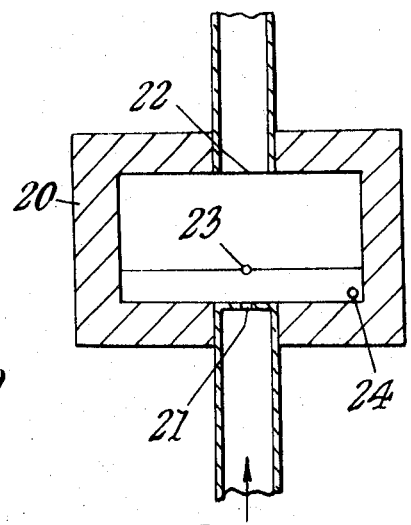
Fig. 1.
Fig. 2.
Fig. 3.

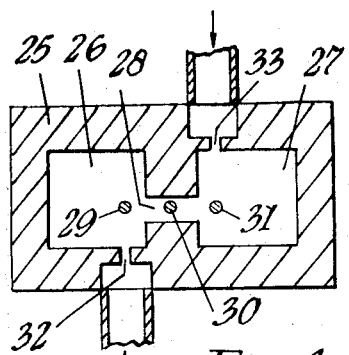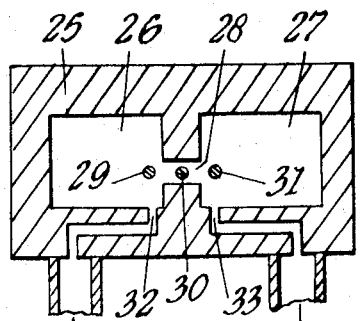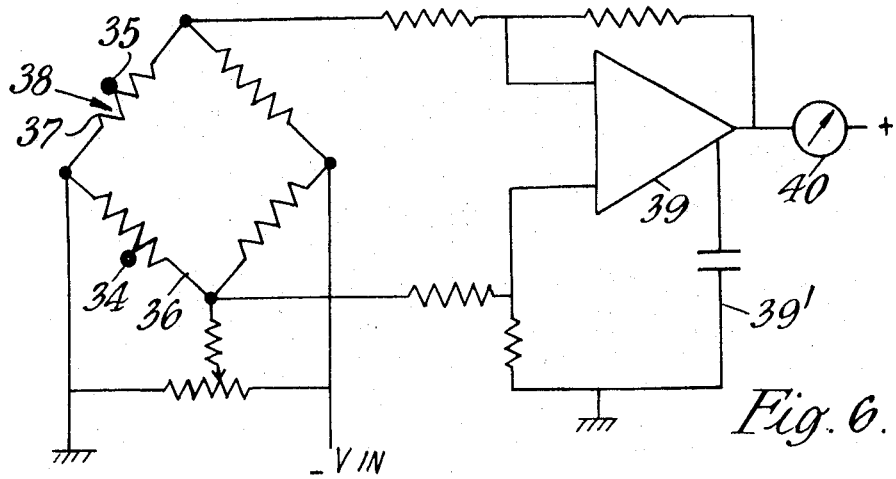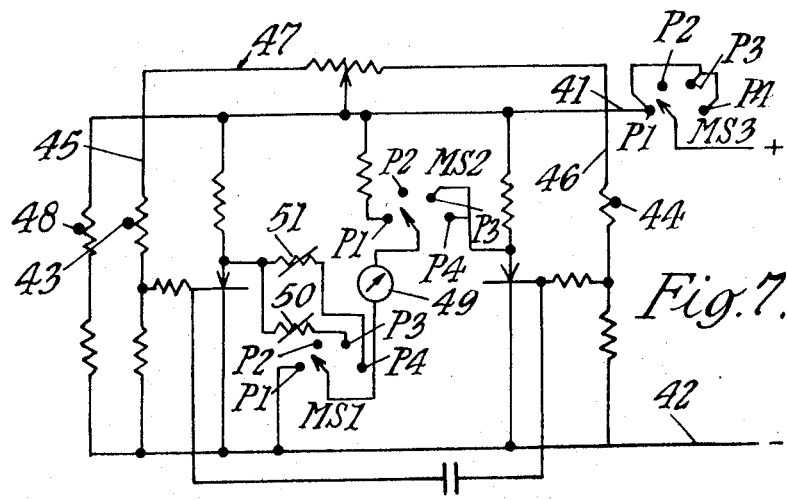

3,625,049
APPARATUS FOR TESTING THE FLUID
TIGHTNESS OF CONTAINERS
Albert Edwin Mills, Letchworth, and Peter Gordon
Davey, Oxford, England, assignors to Cosmopolitan
Assurance Company Limited, Nassau, Bahamas
Continuation of application Ser. No. 722,828, Apr. 22,
1968. This application June 16, 1970, Ser. No. 48,900
Int. Cl. G01m 3/26
U.S. Cl. 73—49.2
17 Claims

ABSTRACT OF THE DISCLOSURE

Leak testing apparatus in which a thermal fluid flow detector is connected in a conduit between, on the one hand a compressed-air source and, on the other hand, a container to be tested. A by-pass conduit is connected across the flow detector and a valve is provided in the by-pass conduit whereby the by-pass conduit can be opened and closed. With the valve open the container can readily be brought to a test pressure and thereafter with the valve closed flow or fluid between the compressed-air source and the container is detected by the thermal fluid flow detector.

---

This application is a streamlined continuation of application Ser. No. 722,828, filed Apr. 22, 1968 now abandoned.

SUMMARY OF INVENTION

The present invention relates to apparatus for testing containers for fluid tightness, which has the capacity of using a very sensitive flow meter but which notwithstanding the use of such a flow meter, can be employed under factory conditions without giving rise to ambiguous readings to test a succession of containers, e.g. petrol tanks. It achieves this by providing an arrangement of conduits, valves and a valve actuation system such that at all times since the apparatus has been connected up to a fluid pressure source, the container can be brought up to test pressure, relieved of that pressure and the meter brought into communication with and effectively isolated from the container, without causing any flow through the meter solely as a result of these operations.

Many containers, e.g. petrol tanks, are required to be fluid tight otherwise than at any aperture therein provided for the purpose of access, and present means for testing the gas or liquid tightness of such containers, employed in quality control of manufacture thereof are unsatisfactory in that they are not sensitive enough to reveal under the conditions of testing, all containers which are not fluid tight. As a result containers pass the test applied, which are not liquid or gas tight as the case may be.

It may here be mentioned that the term "fluid" in this specification refers to liquids as well as to gases.

It is an object of the present invention to provide apparatus employing a flow meter to detect fluid leakage from a container, which apparatus can readily be employed under factory conditions.

There is provided by the present invention apparatus for testing a container for fluid tightness, comprising:

A flow meter providing an access port for influx of fluid and an access port for outflow of fluid;

A first conduit for connecting the container to a source of fluid pressure (hereinafter called the test pressure);

A second conduit for connecting the container to the outflow access port of the flow meter;

A third conduit for connecting the container to the ambient atmosphere;

A fourth conduit for connecting said source to the inflow access port of the flow meter; and Valve means for opening and closing the first, second and third conduits to the passage of fluid therethrough, the valve means comprising control means for operating the valve means so that, in sequence, once the first, second and fourth conduits have been connected to said source the container can be brought into communication with said source to be brought to the test pressure, the flow meter can be brought into communication with the container and the container can be brought into communication with the ambient atmosphere, without causing any measurable flow of fluid through the flow meter solely as a result of thus operating the valve means.

An advantage of the present invention is that since a flow meter can be made extremely sensitive to fluid flow, the apparatus can always be made sensitive to the extent that it is sensitive to a lesser degree of fluid flow than could take place through any leak not tolerable in practice, in the container, but without causing the meter to show any reading due to fluid flow created by the ambient atmosphere or any fluid flow set up in bringing the container to the pressure of the test fluid or in relieving the container of that pressure. As a result, one container after another may be tested under factory conditions with the assurance that the flow meter will only produce a reading due to fluid flow caused by a leak in the container undergoing test and that any container not giving rise to a reading in the flow meter is fluid tight to the extent required.

The present invention will now be described, by way of example only, with reference to the accompanying drawings, like reference numerals refer to like or analogous parts and in which:

FIG. 1 is a diagrammatic drawing showing an apparatus according to the present invention;

FIG. 2 is a sectional elevation of a valve control actuator which may be employed on the apparatus of FIG. 1;

FIGS. 3 to 5 respectively are longitudinal sections of flow chambers of flow meters which may be employed in the apparatus of FIG. 1;

FIG. 6 is a circuit diagram of an electrical circuit of a flow meter employing two thermistors, which may be employed in the apparatus of FIG. 1; and FIG. 7 is a circuit diagram of an electrical circuit of a flow meter employing three thermistors, which may be employed in the apparatus of FIG. 1.

Referring to FIG. 1, the apparatus comprises a flow meter FM providing an access port (not shown) for inflow of fluid, at the left hand side of the meter and an access port (not shown) for outflow of fluid, at the right hand side of the meter, a first conduit C1 for connecting a container 1 to a source of fluid pressure, being the pressure at which the container is to be tested, constituted by an output 2 of an air compressor apparatus generally indicated at 3 comprising a pressure regulator 4 such that compressed air cannot be passed into conduit C1 at a pressure greater than the test pressure.

The apparatus also comprises a second conduit C2 for connecting the container to the outflow access port of the meter, a third conduit C3 for connecting the container to the ambient atmosphere, and a fourth conduit C4 for connecting the fluid pressure source to the inflow access port of the flow meter.

In the embodiment illustrated the first, second and third conduits are connected to the container through a common conduit CC1. This is a convenient practical arrangement although it will be understood that they could be connected separately to the container. The common conduit CC1 is connected to the access aperture (not shown) of the container by any suitable means which will provide an airtight connection between the common conduit and the container. Likewise for practical convenience, the first and fourth conduits are connected to the pressure source 2 through a common conduit CC2.

The apparatus provides valve means for opening and closing the first, second and third conduits to fluid flow, comprising four identical valves, namely, a first valve V1 located in the first conduit, a second valve V2 located in the second conduit, a third valve V3 located in the third conduit and a fourth valve V4 located in the first conduit between valve V1 and the common conduit CC1. Valves V3 and V4 are controlled in operation by a manually actuated control 5 and valves V1 and V2 by an automatically operating control 6 responsive to the pressure in the container. The valves, which are conventional servo spool valves, are operated by air pressure, being moved to the open position by the pressure in the respective conduits C1, C2 and C3 and being urged to the closed position by air pressure greater than the test pressure, delivered through a second output of the compressor apparatus at a pressure regulator 7 thereof. The apparatus accordingly provides a fifth conduit C5 and a sixth conduit C6 connected through a common conduit CC3 to regulator 7 for supplying air pressure from regulator 7 respectively to the manual control 5 and the automatically operating control 6, and a seventh conduit C7 and an eighth conduit C8 to apply the fluid pressure from the control 5 to valves V3 and V4 respectively, and a ninth conduit C9 and tenth conduit C10, to apply the fluid pressure from control 6 to valves V1 and V2 respectively. The control 5 comprises a two-way valve 8 which supplies air pressure delivered by regulator 7 either to conduit C7 or to conduit C8 and similarly control 6 comprises a two-way valve 9 which supplies air pressure delivered by regulator 7 either to conduit C9 or to conduit C10. It will be understood in view of this that:

(a) Operation of the first and second valves must necessarily result in the opening of one and the closing of the other;

(b) Operation of the third and fourth valves must necessarily result in the opening of one and the closing of the other; and, except while the container is being fitted or exhausted, (c) When the first valve is open, the fourth valve is closed and vice versa, and (d) When the second valve is closed, the third valve is open and vice versa.

The control 5 is manually actuated by way of a lever 10, and the control 6 is actuated by an actuator 11 comprising an actuating member in the form of a rod 12 shown in outline in FIG. 1 secured to a diaphragm 13 (also shown in outline) dividing a chamber formed by a casing 14, into two compartments 15, 16. The rod passes through the wall 17 of the casing defining one side of compartment 16; the wall providing a bore (not shown) for this purpose, carrying a sealing ring (not shown) to prevent passage of air through the bore. The actuator further comprises an eleventh conduit C11 for connecting compartment 16 to the fluid pressure source 2 and a twelfth conduit for connecting compartment 15 to the container so that compartment is maintained at the test pressure. When the container is being brought to test pressure, the rod is moved by the diaphragm 13 as the pressure in compartments 15, 16 equalises from a position in which the diaphragm is deflected away from wall 17 of the casing to the position shown in FIG. 1, in which the rod contacts the valve member (not shown) of the control 6 to operate the two way valve and thereby cause simultaneously the fluid pressure of the output of regulator 7 to be applied to the first valve V1 to close that valve and to release the fluid pressure of the output of regulator 7 from the second valve V2 to allow that valve to open under the bias of the test pressure.

Preferably, the above described actuator is employed in a modified and more elaborate form as shown in FIG. 2, by using a larger volume casing and installing two further diaphragms 18, 19 disposed parallel to diaphragm 13 so that a wall of each compartment is formed by one of the diaphragms 18, 19 rather than by a wall of the casing, and so that the actuating rod is carried by all three diaphragms to pass at one end through wall 17 of the casing as in the first described actuator. An advantage of the more elaborate form of the actuator is that it makes it easier to make the structure of compartments 15, 16 otherwise than at the fluid pressure inputs thereto, air tight.

The flow meter employed is preferably one using a thermistor as the flow sensing element. The meter may employ two thermistors, one acting as the flow-sensing element and the other as a reference element i.e. to provide a differential response when flow is taking place through the meter. For this purpose, a flow chamber as shown in FIG. 3 may be employed, the chamber comprising a casing 20, an inflow port defined by an aperture 21 and an outflow port 22. The flow sensing thermistor 23, is located in line with the aperture 21 and at a distance therefrom at which the fluid flow reaches maximum velocity. The reference thermistor 24 is located out of the flow path, for example, in a corner of the casing as shown in FIG. 3.

Three thermistors may be employed, however, arranged in line in the flow path. The three-thermistor meter may use a flow chamber as shown in FIG. 4 or FIG. 5. The flow chambers in FIGS. 4 and 5 each comprise a casing 25 providing two compartments 26, 27 connected by a bridging passage 28 between them, and the three thermistors 29, 30 and 31 are aligned so that thermistor 30 lies in the bridging passage and the thermistors 29 and 31 respectively lie just beyond the terminations of the bridging passage and equidistant from thermistor 30. Each casing provides two access ports 32, 33 and is formed such that the two terminal thermistors 29 and 31, are equidistant from the access ports respectively at a distance at which any flow into the chamber through each is at its maximum velocity. By this arrangement of the access ports and of the thermistors, each chamber can be used for flow in either direction. One of the two terminal thermistors, therefore, acts as the flow sensing element and the other as a reference element. The third thermistor 30 serves to transfer heat to whichever terminal thermistor is being used as the reference element and ensure a sufficient minimum difference in the response of the terminal thermistors to any given fluid flow.

In both the flow chambers of FIGS. 4 and 5, any fluid flow encounters the flow sensing thermistor on a line normal to the line of the three thermistors and passing in one direction, then passes in the line of the three thermistors and then leaves the reference thermistor on a line normal to the line of the thermistors and, in the case of the flow chamber of FIG. 4, passing in the same general direction as said one direction, and in the case of the chamber of FIG. 5, passing in the opposite general direction to said one direction. The chambers of the two figures, therefore, differ only in the configuration of the flow path.

The flow sensing thermistor and the reference thermistor may be arranged in respective arms of a resistance bridge circuit so that any difference in the change in their resistance on fluid flow, unbalances the bridge to produce a scale reading. The output of the bridge may be amplified and to provide readings over more than one range of values, different resistors may be switched into circuit by means of a multi-position switch.

FIG. 6 shows a suitable circuit for a two thermistor flow meter, the two thermistors 34, 35 constituting resistors in respective arms 36, 37 of a conventional resistance bridge circuit generally indicated at 38. The output from the bridge is amplified by an amplifier 39 provided with a stabilising feed-back loop 39', the output from the amplifier being received by a suitable galvanometer 40.

FIG. 7 shows a suitable circuit for a three-thermistor flow meter. The circuit is operated by mains or battery supply through lines 41, 42. The flow sensing thermistor 43 and the reference thermistor 44 again constitute resistors in respective arms 45, 46 of a conventional bridge circuit 47 with the centre thermistor 48 being connected across supply lines 41, 42. The output from the bridge is fed to a suitable galvanometer 49 through one or the other of two range resistors 50, 51, which alternately may be switched into circuit by a multiposition switch indicated in three parts MS1, MS2 and MS3. It will be understood that the switch is shown in separate parts for convenience of illustration and that in practice the three parts constitute a single switch operated by one control. The switch provides four positions P1, P2, P3 and P4. In the first position P1, the circuit current being delivered by the battery, in the second position P2, the meter is in open circuit i.e. off, in the third position P3, range resistor 50 is switched into circuit to receive the output of the bridge, with resistor 51 out of circuit and in the fourth position P4, range 51 is in circuit in place of resistor 50.

In operation of the apparatus of the present invention as described above, the apparatus is connected up with valves V1 and V3 open and valves V2 and V4 closed. The first, fourth and eleventh conduits are connected to the fluid pressure source 2 through common conduit CC2 to bring the pressure in the fourth conduit, compartment 16 of actuator 11, the second conduit up to valve V2 and the first conduit up to valve V4 to test pressure; and the fifth and sixth conduits are connected through common conduit CC3 to regulator 7. The flow meter is then switched on and once the apparatus has been connected up in the above described manner, the meter is left switched on throughout the testing of whatever number of containers is to be tested. One of the containers is then connected to the common conduit CC1 and valve V3 closed and valve V4 opened by operation of lever 10 of valve control 5. This brings the container to test pressure. The compartment 15 is simultaneously brought to test pressure so that when the pressure in the container reaches test pressure, so also does the pressure in compartment 15. No flow takes place through the flow meter in this operation since there is no pressure drop in conduit C4.

When compartment 15 reaches test pressure control 6 operates and simultaneously closes valve V1 and opens valve V2, thereby bringing the flow meter into communication with the container. Since operation of the valves V1 and V2 is simultaneous and since they are identical valves no flow takes place through the flow meter as a result of operation of the valves and thus a reading is obtained on the scale of the flow meter only if there is a leak in the container. The operation of the actuator will be evident to the operator, if necessary an indicator such as a warning light being used, and since if the container leaks, a scale reading would be produced virtually instantaneously after operation of the actuator, the container may be removed promptly after operation thereof. Following operation of the actuator, the lever 10 is again operated, this time to open valve V3 and close valve V4. Again since the two valves are identical and are operated simultaneously no flow takes place through the flow meter as a result of the valve operation but since there is a loss of air in compartment 15 of the actuator, the automatic control 6 operates to open valve V1 and close valve V2. Another container may then be connected up and the test procedure repeated. It may here be explained that although compartment 15 loses air, the pressure in compartment 16 does not drop in spite of the deflection of the diaphragm since it is in communication with the source of test pressure 2.

It will be understood that the test pressure may be less than atmospheric pressure provided it is different from the pressure existing round the outside of the container undergoing test.

I claim:

1. Apparatus for testing a container for fluid tightness, comprising:
    a flow meter providing an access port for inflow of fluid and an access port for outflow of fluid;
    a first conduit for connecting the container to a source of fluid at a test pressure, a second conduit for connecting the container to the outflow access port of the flow meter;
    a third conduit for connecting the container to the ambient atmosphere;
    a fourth conduit for connecting said source to the inflow access port of the flow meter; and
    valve means for opening and closing the first, second and third conduits to the passage of fluid therethrough, the valve means comprising control means for operating the valve means so that in sequences, once the first, second and fourth conduits have been connected to said source, the container can be brought into communication with said source to be brought to the test pressure, the flow meter can be brought into communication with the container and the container can be brought into communication with the ambient atmosphere, without causing any measurable flow of fluid through the flow meter solely as a result of thus operating the valve means.

2. Apparatus as set forth in claim 1, wherein said valve means comprise:
    a first valve located in the first conduit, a second valve located in the second conduit, a third valve located in the third conduit, and a fourth valve located in the first conduit between the first valve and the container when connected to the apparatus; and wherein the control means and the valves are such that
    (a) operation of the first and second valves must necessarily result in the opening of one and the closing of the other;
    (b) operation of the third and fourth valves must necessarily result in the opening of one and the closing of the other.

3. Apparatus as set forth in claim 2, wherein the valves are operated by fluid pressure; and wherein the valves are operated to open the conduits to the flow of fluid by the test pressure and are operated to close the conduits to the flow of fluid by fluid pressure higher than the test pressure.

4. Apparatus as set forth in claim 3, wherein the control means provide manually actuated means for operating the third and fourth valves, and means for automatically operating the first and second valves in response to the attainment of test pressure in the container; and wherein there are provided:
    a fifth conduit to apply said higher fluid pressure to the manually actuated control means,
    a sixth conduit to apply said higher fluid pressure to the automatically operating control means,
    a seventh conduit to apply said higher fluid pressure from the manually actuated control means to the third valve,
    an eighth conduit to apply said higher fluid pressure from the manually actuated control means to the fourth valve,
    a ninth conduit to apply said higher fluid pressure from the automatically operating control means to the first valve, and
    a tenth conduit to apply said higher fluid pressure from the automatically operating control means to the second valve.

5. Apparatus as set forth in claim 4, wherein the automatically operating control means comprise:
    an actuating member, a chamber formed by a rigid casing, a diaphragm dividing said chamber into two compartments, said casing providing an aperture and said actuating member being secured to the diaphragm to extend through said aperture to terminate at one end at the exterior of said casing so that any movement of the diaphragm gives rise to movement of said end, an eleventh conduit for connecting one of said compartments to the container when the latter is connected to the apparatus, and a twelfth conduit for connecting the other of the compartments to the source of said test pressure to maintain said other compartment at the test pressure, whereby (a) while the container is being brought to said test pressure, the actuating member is moved by the diaphragm as the pressure in the two compartments equalizes, from one position to a second position in which the control means are caused by the actuating member simultaneously to apply said higher fluid pressure to said first valve to close that valve, and to release said higher fluid pressure from the second valve to allow that valve to open under the bias of the test pressure, and (b) as the container is brought into communication with the ambient atmosphere and the said one compartment assumes the pressure of the ambient atmosphere, the actuating member is moved from the second position to the first position in which the automatically operating member is caused by the actuating member simultaneously to apply said higher fluid pressure to the second valve to close that valve, and to release said higher fluid pressure from the first valve to allow that valve to open under the bias of the test pressure.

6. Apparatus as set forth in claim 5, wherein said chamber is provided with two further diaphragms lying parallel to the first-mentioned diaphragm so that a wall of each compartment is formed by one of the further diaphragms;

and wherein the actuating member is carried by all three diaphragms.

7. Apparatus as set forth in claim 1, wherein the flow meter comprises two thermistors, one disposed in the flow path in the meter to act as the flow-sensing element of the meter, and one disposed out of said flow path to act as a reference element.

8. Apparatus as set forth in claim 1, wherein the flow meter comprises three thermistors disposed in the flow path in the meter in the direction of flow so that:

(a) the one first to encounter any flow in the meter acts as the flow sensing element, the one last to encounter any flow in the meter acts as a reference element and the one in between acts to maintain a minimum difference in the reaction to any flow between the other two by giving up heat to any fluid flowing onto the thermistor last to encounter the flow, and (b) the centre thermistor of the three is located equi-distant from the other two, and the other two are located equi-distant respectively from the two access ports of the meter so that flow may take place in either direction through with equal effect.

9. Apparatus as set forth in claim 1, wherein the flow meter comprises a thermistor as the flow sensing element of the meter; and wherein the thermistor so employed is located in relation to the inflow access port of the flow meter so that it lies at the place of maximum flow velocity for any given fluid flow through the meter.

10. Apparatus for testing an object for fluid-tightness comprising:

a source of fluid at a test pressure;

a terminal port for connection to an object to be tested;

a first conduit connected between said source and said terminal port;

a thermal fluid-flow detector having at least three elements positioned for detecting continuous fluid flow in said first conduit, said three elements including:

a heater element; and two heat-sensitive resistive elements mounted adjacent said heater element and adapted to be heated differently by said heater element when fluid flow occurs through said first conduit than when no fluid flow occurs through said first conduit;

a circuit connected to said heat-sensitive resistive elements for indicating a change in the resistances of said resistive elements in response to said differential heating which occurs in the presence of said continuous fluid flow;

a bypass conduit connected across said fluid-flow detector;

a valve in said bypass conduit; and means for opening and closing said valve whereby, when said valve is open, said object to be tested can rapidly be brought up to said test pressure and thereafter when said valve is closed a continuous flow of fluid between said source and said object can be detected by said detector.

11. Apparatus in accordance with claim 10 wherein said heat-sensitive resistive elements are thermistors.

12. Apparatus in accordance with claim 11 wherein said heater element is a thermistor.

13. Apparatus in accordance with claim 10 and further including control means for automatically closing said valve when said object is at said test pressure.

14. Apparatus in accordance with claim 13 wherein said control means comprise a differential-pressure switch connected between the terminal port and the said source, the switch being responsive to a predetermined difference in pressure between the terminal port and the said source to open the said valve, and being responsive to equality of pressure between the terminal port and the said source to close the said valve.

15. Apparatus in accordance with claim 14 and including a second valve in series with the fluid-flow detector and operably connected to the differential-pressure switch whereby when the first valve closes the second valve opens and when the first valve opens the second valve closes.

16. Apparatus in accordance with claim 10 including:

a further conduit connected between the terminal port and the atmosphere;

a third valve connected in the said further conduit;

a fourth valve connected in series with the first valve; and manually operable means for operating the third and fourth valves substantially simultaneously such that when one is closed the other is open.

17. Apparatus in accordance with claim 14 wherein the differential-pressure switch comprises:

a chamber;

a diaphragm dividing the chamber to form two compartments;

a conduit connecting one of the compartments to said terminal port;

a conduit connecting the other compartment to said source; and a switch for controlling the first valve, the diaphragm being coupled to the switch.

References Cited

UNITED STATES PATENTS

| | | | |
|---|---|---|---|
| 2,814,203 | 11/1957 | Donohoe | 73—40 X |
| 2,947,938 | 8/1960 | Bennett | 73—204 X |
| 3,246,523 | 4/1966 | Richard | 73—399 X |

LOUIS R. PRINCE, Primary Examiner

W. A. HENRY, Assistant Examiner

PO-1050
(5/69)

UNITED STATES PATENT OFFICE
CERTIFICATE OF CORRECTION

Patent No. 3,625,049            Dated December 7, 1971

Inventor(s) Albert E. Mills and Peter G. Davey

It is certified that error appears in the above-identified patent and that said Letters Patent are hereby corrected as shown below:

Cancel "assignors" and substitute --one half interest of Mills only assigned to--

Signed and sealed this 28th day of November 1972.

(SEAL)
Attest:

EDWARD M. FLETCHER, JR.
Attesting Officer

ROBERT GOTTSCHALK
Commissioner of Patents